United States Patent [19]
Büchel

[11] 3,929,820
[45] *Dec. 30, 1975

[54] PROCESS FOR THE PRODUCTION OF N-TRITYLIMIDAZOLES

[75] Inventor: Karl-Heinz Büchel, Leverkusen, Germany

[73] Assignee: Bayer Aktiengesellschaft, Germany

[ * ] Notice: The portion of the term of this patent subsequent to Jan. 6, 1990, has been disclaimed.

[22] Filed: Apr. 18, 1974

[21] Appl. No.: 461,886

Related U.S. Application Data

[60] Continuation of Ser. No. 267,610, June 29, 1972, abandoned, which is a continuation-in-part of Ser. Nos. 37,841, May 15, 1970, Pat. No. 3,691,192, and Ser. No. 37,850, May 15, 1970, Pat. No. 3,711,497, each is a division of Ser. No. 789,601, Jan. 7, 1969, abandoned, and Ser. No. 762,161, Sept. 24, 1968, abandoned.

[30] Foreign Application Priority Data

Sept. 26, 1967 Germany.............................. 53587
Jan. 29, 1968 Germany........................... 1670976

[52] U.S. Cl. ................. 260/309; 260/389; 260/999
[51] Int. Cl.$^2$......................................... C07D 233/62
[58] Field of Search ................................... 260/309

[56] References Cited
UNITED STATES PATENTS

| | | |
|---|---|---|
| 3,244,726 | 4/1966 | Karmas............................... 260/309 |
| 3,259,622 | 7/1966 | Shen et al........................... 260/309 |
| 3,321,366 | 5/1967 | Mussell et al....................... 260/309 |
| 3,391,156 | 7/1968 | Beaman et al...................... 260/309 |
| 3,711,497 | 1/1973 | Buchel............................... 260/309 |

OTHER PUBLICATIONS

Fournari et al., "Bul. Soc. Chim." France, 1968, pp. 2438–2446, (June 1968).
Giesemann et al., I "Chem. Abst.", Vol. 53, columns 10190–10191, (1959).
Giesemann et al., II "Chem. Berichte", Vol. 92, pp. 92–98, (1959).
Giesemann et al., III "Chem. Abst.", Vol. 54, columns 15368–15369, (1960).
Giesemann et al., IV "Chem. Berichte", Vol. 93, pp. 570–576, (1960).
Kittila Dimethylformamide, "Chemical Uses", pp. VIII and 10–14, Wilmington, E. I. Du Pont de Nemours & Co., 1967.
Parker In: Raphael et al., "Advances in Organic Chemistry", Vol. 5, pp. 2, 3 and 22–24, N.Y., Interscience—Wiley, 1965.

*Primary Examiner*—Natalie Trousof

[57] ABSTRACT

N-Tritylimidazoles are produced by reacting imidazole with a mono-, di- or tri substituted trityl halide in a polar inert organic solvent having a dielectric constant of at least 4.5 at a temperature of substantially between about 0°C to 100°C in the presence of an acid binder.

69 Claims, No Drawings

PROCESS FOR THE PRODUCTION OF N-TRITYLIMIDAZOLES

This application is a continuation of U.S. application Ser. No. 267,610, filed June 29, 1972, now abandoned, which in turn is a continuation-in-part consolidation of U.S. applications Ser. No. 37,841, filed May 15, 1970, now U.S Pat. No. 3,691,192, and Ser. No. 37,850, filed May 15, 1970, now U.S. Pat. No. 3,711,497, both of which are respectively divisions of U.S. applications Ser. No. 789,601, filed Jan. 7, 1969, now abandoned, and Ser. No. 762,161, filed Sept. 24, 1968, now abandoned.

The present invention relates to and has for its objects the provision for particular new methods of producing N-tritylimidazoles, which are known fungicides for combating fungi pathogenic to plants (U.S. Pat. No. 3,321,366), e.g. in a simple reaction, using readily available starting materials whereby to attain outstanding yields, with other and further objects of the invention becoming apparent from a study of the within specification and accompanying examples.

It is known (see Chem. Ber. 92, 92–98 [1959]) that N-tritylimidazoles are obtained when silver salts of imidazoles are reacted with triphenylchloromethane, i.e. trityl chloride, in boiling benzene. This process, however, has many disadvantages. The silver salts of the imidazoles have to be prepared separately and are expensive. The yields in the case of the initial silver salt preparation reaction are very low and generally lie between 11.5 and 49.7%. According to this known process, the ultimate N-tritylimidazole is obtained only in about 27% yield. Furthermore, it is expressly stated that in the reaction of free imidazole, instead of the silver salt, with triphenylchloromethane in benzene no homogeneous reaction product is formed and, when the components are heated without solvents, only resins are obtained.

It has now been found in accordance with the present invention that a versatile and smooth process may be provided for the production, in favorable yields and high purity, of N-tritylimidazoles having the general formula

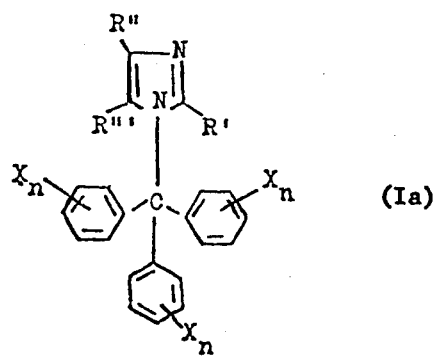

(Ia)

in which

X is halogen, alkyl of 1 to 3 carbon atoms, alkoxy of 1 to 3 carbon atoms, nitro, cyano, alkylmercapto of 1 to 3 carbon atoms or fluoro- substituted alkyl of 1 or 2 carbon atoms, $n$ is 0, 1 or 2, preferably 2 $n$'s are 0 and 1 $n$ is 1, R' is hydrogen, alkyl or aryl, and either R'' is hydrogen, alkyl or aryl, and
R''' is hydrogen, alkyl or aryl, or R'' and R''', together with the ethylene bridge to which they are shown attached, form a benzene ring, preferably R', R'' and R''' are hydrogen which comprises reacting an imidazole having the formula

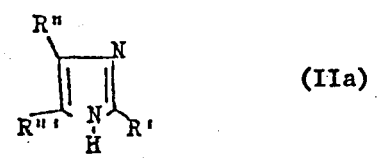

in which

R', R'' and R''' are the same as defined above with a trityl halide having the formula

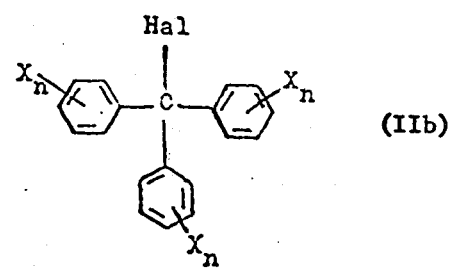

in which

X and $n$ are the same as defined above, and Hal is halogen, such as chloro, bromo, iodo or fluoro, especially chloro, in a polar inert organic solvent having a dielectric constant of at least 4.5 at a temperature of substantially between about 0° to 100°C in the presence of an acid binder.

It is very surprising that in the process according to the present invention the desired N-tritylimidazoles are formed and in a high yield, since it is known that when the components are reacted in benzene no reaction product can be isolated and when heated without solvents only resins are obtained.

The process of the present invention exhibits great advantages in comparison with the known silver salt method. For example, the N-tritylimidazoles are obtained herein by a one-step reaction and the products can be formed in very high yields and with great purity.

For instance, if imidazole and trityl chloride are used as starting materials, the instant reaction can be represented by the following typical formula scheme:

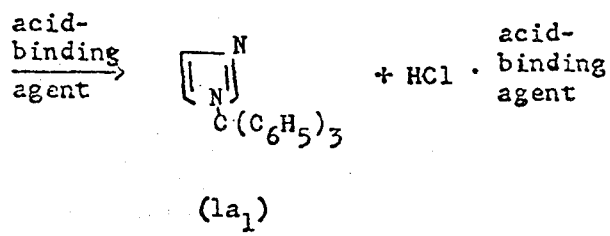

(IIaa)    (IIba)         (Ia₁)

The necessary starting materials are clearly characterized by the formulae (IIa) and (IIb) above. Such starting materials are already known or may be obtained according to techniques per se known; see for example:

Org. Synth. Coll. Vol. III, 841–846, 839–840;
A. I. Vogel: A textbook of Practical Organic Chemistry (1957) London, 815 & 816;
L. Gattermann & H. Wieland: Die Praxis des Organischen Chemikers (1952) Berlin, 297 & 298;
Organikum - Organisch Chemisches Grundpraktikum (1962) Berlin, 286 & 287;
J. Org. Chem. 7, 392 (1942);
Chem Ber. 37, 597 (1904);
Chem. Ber. 39, 3274 (1906);
Chem. Ber. 42, 416 (1909);
J. Am. Chem. Soc. 33, 531 (1911);
Am. Chem 479, 111 & 112 (1930); and
J. Chem. Soc. 1940, 1249.

Advantageously, in accordance with the present invention, in the various formulae herein:

X represents
halogen such as o-, m- and p- chloro, bromo, fluoro or iodo, especially chloro, bromo, fluoro and more especially o-, m- and p- chloro, o-, m- and p- fluoro, and p- bromo, and mixed chloro-bromo, chloro-fluoro and bromo-fluoro;

straight and branched o-, m- and p- alkyl of 1 to 3 carbon atoms, including methyl, ethyl and n- and isopropyl, especially o- and p- alkyl of 1 to 3 carbon atoms and particularly methyl, and especially o- and p-methyl;

straight and branched chain o-, m- and p- alkoxy of 1 to 3 carbon atoms, such as methoxy, ethoxy and n- and iso-propoxy, especially o- and p- alkoxy of 1 to 3 carbon atoms and particularly methoxy and especially o- methoxy;

o-, m- and p- nitro, especially p-nitro;

o-, m- and p- cyano, especially p-cyano;

o-, m- and p- alkylmercapto of 1 to 3 carbon atoms such as methylmercapto, ethylmercapto, n- and isopropylmercapto, especially o- and p- alkylmercapto, and particularly p-methylmercapto; or o-, m- and p- fluoro-substituted alkyl of 1-2 carbon atoms such as methyl or ethyl, especially fluoroalkyl of 1 to 2 carbon atoms having 1-5 fluoro substituents, more especially mono-, di- and tri-fluoro-methyl, and mono-, di-, tri-, tetra- and pentafluoroethyl, preferably m-fluoro-$C_{1-2}$ alkyl having 1–5 fluoro groups, and particularly m-trifluoromethyl;

$n$ is a whole number from 0 to 2, i.e. 0, 1 or 2, and as mentioned above, preferably 2 $n$'s are 0 and 1 $n$ is 1;

R' represents
hydrogen;
straight and branched alkyl such as lower alkyl, especially of 1-4 carbon atoms, as defined above, and particularly methyl; or
aryl such as aryl having 6–10 carbon atoms, including phenyl, naphthyl, and the like, and particularly phenyl; and R'' and R''' each individually represents hydrogen, alkyl or aryl as defined above for R';
with the proviso that R'' and R''' when taken together with the adjacent ethylene bridge of the imidazole ring to which they are attached form a corresponding benzene ring, i.e. form a benzimidazole moiety. As mentioned above, R', R'' and R''' are preferably hydrogen.

In accordance with a particularly preferred embodiment of the present process, X is chloro, bromo, fluoro, methyl, methoxy or trifluoromethyl; or p-chloro, bromo or fluoro; or o-methyl or methoxy.

The solvent used in accordance with the present invention is a polar inert organic solvent having a dielectric constant (D) of at least 4.5 and up to about 180; the preferred range lies between about 15 and about 50. Such solvents include for example nitriles, such as acetonitrile (D = 37.5), propionitrile, butylnitrile; sulfoxides, such as dimethyl sulfoxide (D = 48.9); formamides, such as formamide, N-methylformamide (D = 182.4), N-methylacetamide (D = 169.7), dimethyl formamide; ketones, such as acetone (D = 20.7), methylethylketone, diethylketone, dipropylketone, diisopropylketone, cyclohexanone as well as mono- and di-lower alkyl-cyclohexanones and mesityloxide; nitro compounds, such as nitromethane (D = 35.8) or nitrobenzene (D = 34.5); unsymmetrical chlorinated hydrocarbons, such as chloroform (D = 4.8) as well as ethylenchloride (D = 10.0), mono- and dichlorobenzenes; ethers such as diethylether, diisopropylether, dibutylether, tetrahydrofurane; sulfones, such as tetramethylenesulfone; etherglycolacetates, such as ethylenglycol-monomethyletheracetate, -monoethyletheracetate, and -monobutyletheracetate; esters of lower aliphatic carbonic, i.e. carboxylic acids with 1 to 5 carbon atoms with alcohols having up to 8 carbon atoms, such as acetic acid ethylester, acetic acid butylester, butyric acid methylester, and butyric acid ethylester; cyanoacetic acid esters with alcohols having up to 8 carbon atoms, such as cyanoacetic acid ethylester and acetoacetic acid ethylester. Particularly good are polar inert organic solvents which have a dielectric constant of more than 15. Preferred solvents for the reaction are nitriles and ketones.

The solvents lying within the above-mentioned range of the dielectric constant (D) can, of course, also be used in mixtures.

Thus, the instant polar inert organic solvents generally contemplate lower aliphatic, especially lower, e.g. $C_{1-5}$, alkanoic, acid nitriles; dilower, e.g. $C_{1-5}$, alkyl -sulfoxides and -formamides lower aliphatic, especially lower, e.g. $C_{1-5}$, alkyl, ketones and particularly di-$C_{1-4}$ lower alkyl ketones; nitro lower, e.g. $C_{1-5}$, alkanes; unsymmetrical chlorinated alkanes, especially chlorinated lower, e.g. $C_{1-5}$, alkanes; and the like; all of which have a dielectric constant of at least 4.5, and preferably more than 15.

The reaction is carried out in the presence of an acid binder, i.e. acid-binding agent. Preferably, a suitable excess of the corresponding imidazole, or a tertiary amine, such as trialkyl, especially trilower, e.g. $C_{1-5}$, alkyl, amine including dialkyl, especially dilower, e.g. $C_{1-5}$, alkyl, -benzyl amine including dimethyl benzyl amine, or pyridine is used. However, the organic acid binders otherwise customarily used may also be employed. It is, of course, also possible to use as polar inert organic solvent a liquid acid binding agent if its dielectric constant lies within the above-mentioned range. It is from 4.5 - 180, preferably 15 - 50.

The reaction temperatures can be varied advantageously within a fairly wide range. In general, the instant reaction is carried out at temperatures substantially between about 0°–100°C, and preferably between about 45°–90°C.

When carrying out the production process of the present invention, the starting materials are generally used in approximately equimolar amounts, and an approximately equimolar amount of the acid binder is also used advantageously. The reaction time depends on the reaction temperature, as the artisan will appreciate, and generally is from 3 to 24 hours. In the working up of the reaction mixture, the solvent is removed, e.g. by vacuum distillation, and the reaction product may be freed from amine hydrochloride by washing with water or, if the amine hydrochloride is sparingly soluble in water, the reaction product may be separated from the hydrochloride with any suitable organic solvent, e.g. of the foregoing type or generally one in which the amine hydrochloride is insoluble.

The N-tritylimidazoles which are prepared by the process of the present invention are known to be fungicidally effective against numerous fungi pathogenic to plants (see U.S. Pat. No. 3,321,366). Furthermore, the N-tritylimidazoles obtainable in accordance with this process wherein 2 $n$'s are 0 and 1 $n$ is 1 show antimycotic activity. (See for example U.S. Pat. Nos. 3,655,899; 3,655,900; 3,657,442; 3,657,445; 3,658,956; 3,660,576; and 3,666,577.) These compounds can be formulated into compositions useful against fungi pathogenic to plants and also into formulations useful against fungi pathogenic to humans and animals. (See for example U.S. Pat. Nos. 3,665,076; 3,665,077; 3,665,078; 3,665,079; and 3,666,862.)

The production process of the present invention is illustrated, without limitation, by the following examples:

EXAMPLE 1

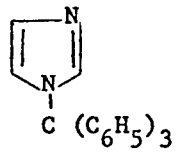

(1a$_2$)

1. 27.4g (0.4 mol) imidazole and 55.6g (0.2 mol) triphenylchloromethane are dissolved in 500 ml acetonitrile and heated to 82°C for 3 hours. The acetonitrile is then distilled off in a vacuum and the residue is taken up in boiling xylene. The imidazole hydrochloride remains behind largely undissolved. From the xylene which is filtered off, the N-tritylimidazole crystallizes out in coarse, colorless needles after cooling. Yield: 61g (98% of the theory). Again recrystallized from xylene, m.p. 227°–228°C.

2. The reaction is carried out as stated under (1). The crude product is, however, thoroughly washed with water, the imidazole hydrochloride being dissolved out. The product is dried and recrystallized from xylene or a little acetone. 56g (90% of the theory) of N-tritylimidazole of m.p. 227°–228°C are obtained.

3. 3.4g (0.05 mol) imidazole are heated with 13.9g (0.05 mol) triphenylchloromethane in 120 ml acetonitrile to 80°–82°C for 3 hours, during which 5g (0.05 mol) triethyl amine are added. The acetonitrile is then distilled off in a vacuum and the triethylamine hydrochloride is washed out with water. The residue, after recrystallization from xylene, yields 14g (90% of the theory) of N-tritylimidazole of m.p. 227°C.

EXAMPLE 2

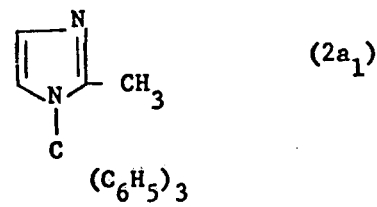

(2a$_1$)

16.4g (0.2 mol) 2-methylimidazole and 27.9g (0.1 mol) triphenylchloromethane are heated to the boil in 200 ml acetonitrile. The acetonitrile is evaporated to one-half its original volume, the precipitated solid substance which forms is filtered off with suction and dissolved in hot xylene. Filtration from residual, undissolved hydrochloride is effected. From xylene there crystallize 22g (68% of the theory) of 2-methyl-N-tritylimidazole of m.p. 225°C.

In analogous manner, the following compounds are obtained:

2,4-(5)-dimethyl-N-tritylimidazole:

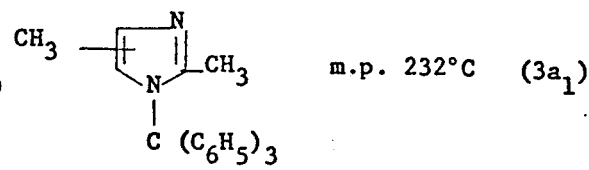

m.p. 232°C    (3a$_1$)

It is not clear to which nitrogen the trityl group is attached.

N-tritylbenzimidazole:

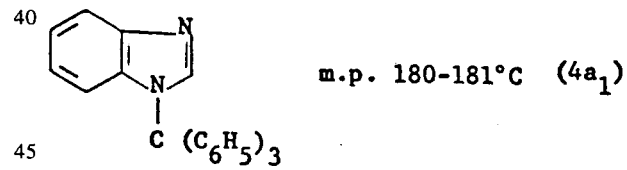

m.p. 180-181°C    (4a$_1$)

Example 3

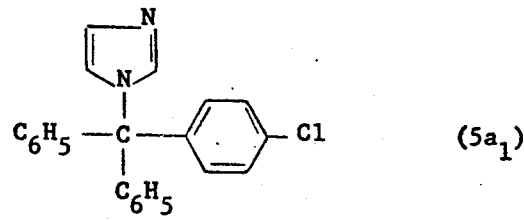

(5a$_1$)

156.5g (0.5 mol) of (p-chlorophenyl)-(diphenyl)-methyl chloride and 34g (0.5 mol) imidazole are dissolved in 500 ml acetonitrile, with stirring, and 51g (0.5 mol) triethylamine are added, whereupon separation of triethylamine hydrochloride occurs even at room temperature. In order to complete the reaction, heating at 50°C is carried out for three hours. After cooling, 1 liter of benzene is added and the reaction mixture is stirred, then washed salt-free with water. The benzene solution is dried over anhydrous sodium sulfate, filtered and concentrated by evaporation; giving 167g of crude 1-[(p-chlorophenyl)-(bisphenyl)-methyl]-imidazole, m.p. 125°C. By recrystallization from 200 ml benzene and 100 ml ligroin, 115g (—71% of the theory) of pure 1-[(p-chlorophenyl)-(bis-phenyl)-methyl]-imidazole of m.p. 140°C are obtained.

EXAMPLE 4

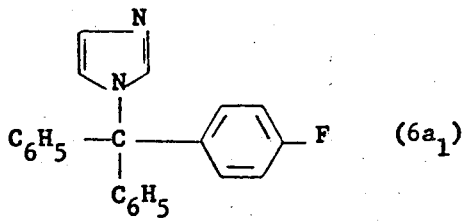

34g (0.5 mol) imidazole are dissolved at room temperature, with stirring, in a solution of 148.25g (0.5 mol) of (p-fluorophenyl)-(diphenyl)-methyl chloride in 500 ml acetonitrile. Following this, 51g (0.5 mol) triethylamine are added dropwise; triethylamine hydrochloride separates immediately upon heating. For completion of the reaction, the mixture is heated at 50°C for 3 hours. After cooling, the reaction mixture is stirred together with 1 liter of benzene and washed salt-free with water. The benzene solution is dried over anhydrous sodium sulfate, filtered and concentrated by evaporation; giving 148g of crude 1-[(p-fluorophenyl)-(bisphenyl)-methyl]-imidazole of m.p. 146°C (= 91% of the theory). By recrystallation from 300 ml benzene and 50 ml ligroin, the m.p. rises to 148°C.

The (p-fluorophenyl)-(diphenyl)-methyl chloride used as starting material can be prepared as follows: 174.9g (1 mol) p-fluoro-bromobenzene in 175 ml ether are slowly added dropwise to 24.3g (1 gram-atom) magnesium in 300 ml ether. After all the magnesium is dissolved, a solution of 182g (1 mol) benzophenone in 500 ml ether is added dropwise. The magnesium salt of the alcohol separates from the initially deep-violet solution towards the end of the reaction. By washing with 10% ammonium chloride solution, the alcohol is obtained which, without isolation, is immediately further processed by dissolving it in 1 liter of benzene, adding 50g of calcium chloride and introducing hydrogen chloride gas until saturation. After filtration and removal of the solvent, the resulting crystal slurry is vigorously suction filtered and the crystals obtained are washed with petroleum ether. 205g (= 69% of the theory) of 1-[(p-fluorophenyl)-(diphenyl)-methyl]-imidazole chloride of m.p. 88°C are obtained.

EXAMPLE 5

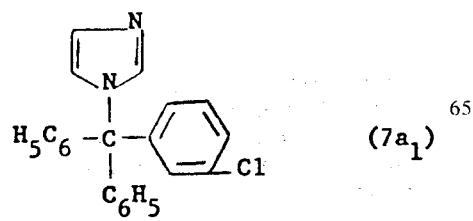

27.2g (0.4 mol) imidazole and 62.8g (0.2 mol) of (m-chlorophenyl)-(diphenyl)-methyl chloride are heated to 80°C for 4 hours in 150 ml of dry acetonitrile and 50 ml dimethyl formamide. The solvent is then drawn off and the residue is digested with water to remove the imidazole hydrochloride. The residue is taken up in methylene chloride, dried over sodium sulfate, and the viscous oil remaining behind after the distilling off of the solvent is recrystallized from cyclohexane. 52g (75% of the theory) of 1-[(m-chlorophenyl)-(bis-phenyl)-methyl]-imidazole of m.p. 101°C are obtained.

In analogous manner, the following compounds were prepared wherein 2 $n$'s are 0 and 1 $n$ is 1 and R', R'' and R''' are hydrogen:

| Compound | X | m.p. °C |
|---|---|---|
| (8a$_1$) | o-Cl | 140 |
| (9a$_1$) | m-CF$_3$ | 156 |
| (10a$_1$) | o-OCH$_3$ | 130 |
| (11a$_1$) | p-Br | 152 |
| (12a$_1$) | p-SCH$_3$ | 142 |
| (13a$_1$) | p-CH$_3$ | 130 |
| (14a$_1$) | o-F | 185 |
| (15a$_1$) | m-F | 174 |
| (16a$_1$) | p-NO$_2$ | 160–170 |
| (17a$_1$) | p-CN | 164 |

It will be appreciated that the instant specification and examples are set forth by way of illustration and not limitation, and that various modifications and changes may be made without departing from the spirit and scope of the present invention which is to be limited only by the scope of the apended claims.

What is claimed is:

1. A process for the production of an N-tritylimidazole of the formula:

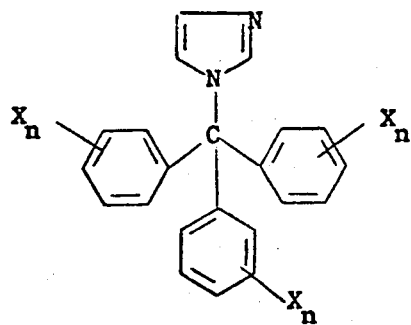

wherein
X is halogen, and 2 $n$'s are 0 and 1 $n$ is 1,
which consists essentially of reacting imidazole of the formula:

with a tritylhalide of the formula

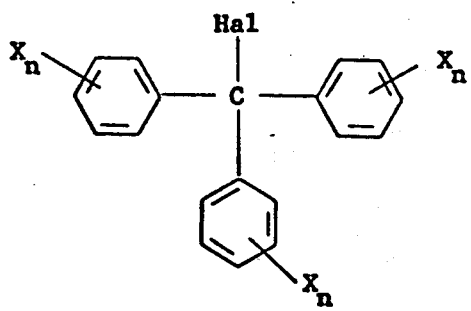

wherein X and n are as above defined, and Hal is halo, in a polar inert organic solvent having a dielectric constant greater than 15 at a temperature substantially between about 0°C to 100°C in the presence of an organic acid binding agent.

2. A process according to claim 1, wherein said solvent has a dielectric constant between 15 and 50.

3. A process according to claim 1, wherein the temperature is between about 45°C to 90°C.

4. A process according to claim 1, wherein said solvent is selected from the group consisting of acetonitrile, propionitrile, butylnitrile, dimethyl sulfoxide, formamide, N-methylformamide, N-methylacetamide, dimethyl formamide, acetone, methylethylketone, diethylketone, cyclohexanon, mesityloxide, nitromethane, nitrobenzene, tetramethylenesulfone, ethyleneglycol-monomethyletheracetate, ethyleneglycol-monoethyletheracetate, ethyleneglycol-monobutyletheracetate, butyric acid ethylester, cyanoacetic acid ethylester and acetoacetic acid ethylester.

5. A process according to claim 1, wherein an excess of acid binding agent is used and the agent is selected from the group consisting of imidazole and a tertiary amine.

6. A process according to claim 1, wherein at least the stoichiometric amount of imidazole is used and the solvent is acetonitrile.

7. A process according to claim 6, wherein at least the stoichiometric amount of the acid binding agent is used.

8. A process according to claim 1, wherein X is chloro, bromo, fluoro or iodo.

9. A process according to claim 1, wherein X is chloro.

10. A process according to claim 1, wherein X is bromo.

11. A process according to claim 1, wherein X is fluoro.

12. A process according to claim 1, wherein X is iodo.

13. A process according to claim 4, wherein the solvent is selected from the group consisting of acetonitrile, propionitrile, butylnitrile, dimethyl sulfoxide, formamide, N-methylformamide, N-methylacetamide, dimethyl formamide, acetone, methylethylketone, diethylketon, cyclohexanon, mesityloxide, nitromethane, nitrobenzene, cyanoacetic acid ethylester and acetoacetic acid ethylester.

14. A process for the production of an N-tritylimidazole of the formula:

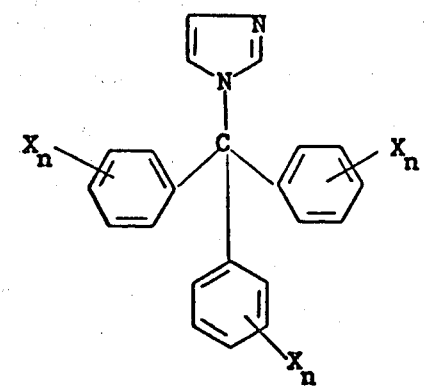

wherein
X is methyl, and 2 n's are 0 and 1 n is 1, which consists essentially of reacting imidazole of the formula

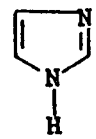

with a tritylhalide of the formula

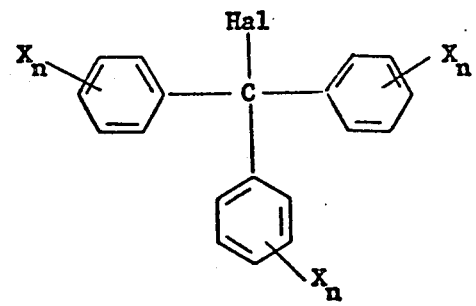

wherein X and n are as above defined, and Hal is halo, in a polar inert organic solvent having a dielectric constant greater than 15 at a temperature substantially between about 0°C to 100°C in the presence of an organic acid binding agent.

15. A process according to claim 14, wherein said solvent has a dielectric constant between 15 and 50.

16. A process according to claim 14, wherein the temperature is between about 45°C to 90°C.

17. A process according to claim 14, wherein said solvent is selected from the group consisting of acetonitrile, propionitrile, butylnitrile, dimethyl sulfoxide, formamide, N-methylformamide, N-methylacetamide, dimethylformamide, acetone, methylethylketone, diethylketone, cyclohexanon, mesityloxide, nitromethane, nitrobenzene, tetramethylenesulfone, ethyleneglycol-monomethyletheracetate, ethyleneglycol-monoethyletheracetate, ethyleneglycol-monobutyletheracetate, butyric acid ethylester, cyanoacetic acid ethylester and acetoacetic acid ethylester.

18. A process according to claim 14, wherein an excess of acid binding agent is used and the agent is selected from the group consisting of imidazole and a tertiary amine.

19. A process according to claim 14, wherein at least the stoichiometric amount of imidazole is used and the solvent is acetonitrile.

20. A process according to claim 19, wherein at least the stoichiometric amount of the acid binding agent is used.

21. A process according to claim 17, wherein the solvent is selected from the group consisting of acetonitrile, propionitrile, butylnitrile, dimethyl sulfoxide, formamide, N-methylformamide, N-methylacetamide, dimethyl formamide, acetone, methylethylketone, diethylketone, cyclohexanon, mesityloxide, nitromethane, nitrobenzene, cyanoacetic acid ethylester and acetoacetic acid ethylester.

22. A process for the production of an N-tritylimidazole of the formula:

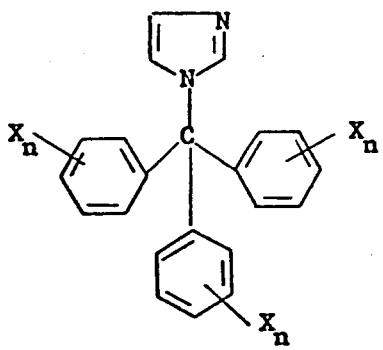

wherein
X is ethyl, and 2 $n$'s are 0 and 1 $n$ is 1, which consists essentially of reacting imidazole of the formula

with a tritylhalide of the formula

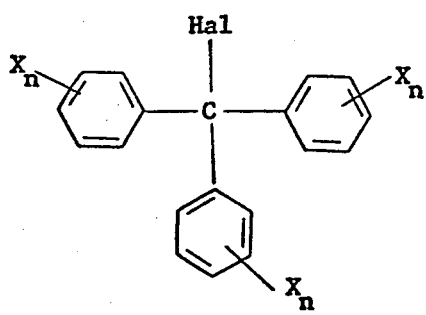

wherein X and $n$ are as above defined, and Hal is halo, in a polar inert organic solvent having a dielectric constant greater than 15 at a temperature substantially between about 0°C to 100°C in the presence of an organic acid binding agent.

23. A process according to claim 22, wherein said solvent has a dielectric constant between 15 and 50.

24. A process according to claim 22, wherein the temperature is between about 45°C to 90°C.

25. A process according to claim 22, wherein said solvent is selected from the group consisting of acetonitrile, propionitrile, butylnitrile, dimethyl sulfoxide, formamide, N-methylformamide, N-methylacetamide, dimethyl formamide, acetone, methylethylketone, diethylketone, cyclohexanon, mesityloxide, nitromethane, nitrobenzene, tetramethylenesulfone, ethyleneglycol-monomethyletheracetate, ethyleneglycol-monoethyletheracetate, ethyleneglycol-monobutyletheracetate, butyric acid ethylester, cyanoacetic acid ethylester and acetoacetic acid ethylester.

26. A process according to claim 22, wherein an excess of acid binding agent is used and the agent is selected from the group consisting of imidazole and a tertiary amine.

27. A process according to claim 22, wherein at least the stoichiometric amount of imidazole is used and the solvent is acetonitrile.

28. A process according to claim 27, wherein at least the stoichiometric amount of the acid binding agent is used.

29. A process according to claim 25, wherein the solvent is selected from the group consisting of acetonitrile, propionitrile, butylnitrile, dimethyl sulfoxide, formamide, N-methylformamide, N-methylacetamide, dimethylformamide, acetone, methylethylketone, diethylketone, cyclohexanon, mesityloxide, nitromethane, nitrobenzene, cyanoacetic acid ethylester and acetoacetic acid ethylester.

30. A process for the production of an N-tritylimidazole of the formula:

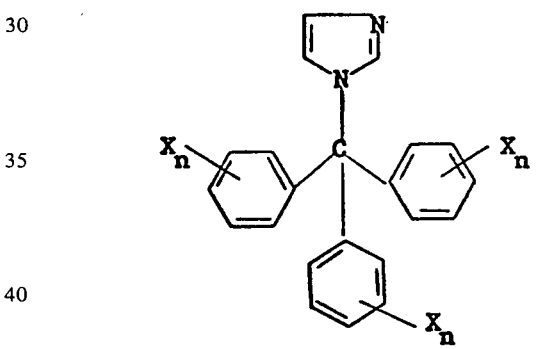

wherein
X is n-propyl or isopropyl, and 2 $n$'s are 0 and 1 $n$ is 1, which consists essentially of reacting imidazole of the formula

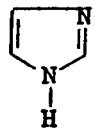

with a tritylhalide of the formula

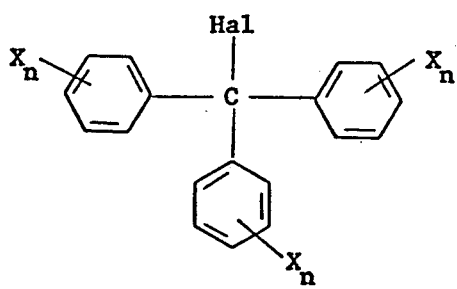

wherein X and n are as above defined, and Hal is halo, in a polar inert organic solvent having a dielectric constant greater than 15 at a temperature substantially between about 0°C to 100°C in the presence of an organic acid binding agent.

31. A process according to claim 30, wherein said solvent has a dielectric constant between 15 and 50.

32. A process according to claim 30, wherein the temperature is between about 45°C to 90°C.

33. A process according to claim 30, wherein said solvent is selected from the group consisting of acetonitrile, propionitrile, butylnitrile, dimethyl sulfoxide, formamide, N-methylformamide, N-methylacetamide, dimethyl formamide, acetone, methylethylketone, diethylketone, cyclohexanon, mesityloxide, nitromethane, nitrobenzene, tetramethylenesulfone, ethyleneglycol-monomethyletheracetate, ethyleneglycol-monoethyletheracetate, ethyleneglycol-monobutyletheracetate, butyric acid ethylester, cyanoacetic acid ethylester and acetoacetic acid ethylester.

34. A process according to claim 30, wherein an excess of acid binding agent is used and the agent is selected from the group consisting of imidazole and a tertiary amine.

35. A process according to claim 30, wherein at least the stoichiometric amount of imidazole is used and the solvent is acetonitrile.

36. A process according to claim 35, wherein at least the stoichiometric amount of the acid binding agent is used.

37. A process according to claim 33, wherein the solvent is selected from the group consisting of acetonitrile, propionitrile, butylnitrile, dimethyl sulfoxide, formamide, N-methylformamide, N-methylacetamide, dimethyl formamide, acetone, methylethylketone, diethylketone, cyclohexanon, mesityloxide, nitromethane, nitrobenzene, cyanoacetic acid ethylester and acetoacetic acid ethylester.

38. A process for the production of an N-tritylimidazole of the formula:

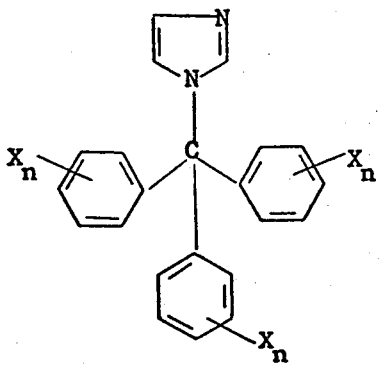

wherein
X is methoxy, and 2 n's are 0 and 1 n is 1, which consists essentially of reacting imidacole of the formula

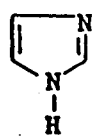

with a tritylhalide of the formula

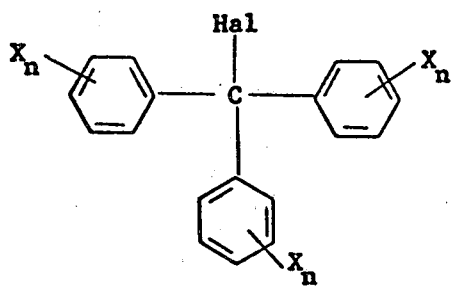

wherein X and n are as above defined, and Hal is halo, in a polar inert organic solvent having a dielectric constant greater than 15 at a temperature substantially between about 0°C to 100°C in the presence of an organic acid binding agent.

39. A process according to claim 38, wherein said solvent has a dielectric constant between 15 and 50.

40. A process according to claim 38, wherein the temperature is between about 45°C to 90°C.

41. A process according to claim 38, wherein said solvent is selected from the group consisting of acetonitrile, propionitrile, butylnitrile, dimethyl sulfoxide, formamide, N-methylformamide, N-methylacetamide, dimethyl formamide, acetone, methylethylketone, diethylketone, cyclohexanon, mesityloxide, nitromethane, nitrobenzene, tetramethylenesulfone, ethyleneglycol-monomethyletheracetate, ethyleneglycol-monoethyletheracetate, ethyleneglycol-monobutyletheracetate, butyric acid ethylester, cyanoacetic acid ethylester and acetoacetic acid ethylester.

42. A process according to claim 38, wherein an excess of acid binding agent is used and the agent is selected from the group consisting of imidazole and a tertiary amine.

43. A process according to claim 38, wherein at least the stoichiometric amount of imidazole is used and the solvent is acetonitrile.

44. A process according to claim 43, wherein at least the stoichiometric amount of the acid binding agent is used.

45. A process according to claim 41, wherein the solvent is selected from the group consisting of acetonitrile, propionitrile, butylnitrile, dimethyl sulfoxide, formamide, N-methylformamide, N-methylacetamide, dimethyl formamide, acetone, methylethylketone, diethylketone, cyclohexanon, mesityloxide, nitromethane, nitrobenzene, cyanoacetic acid ethylester and acetoacetic acid ethylester.

46. A process for the production of an N-tritylimidazole of the formula:

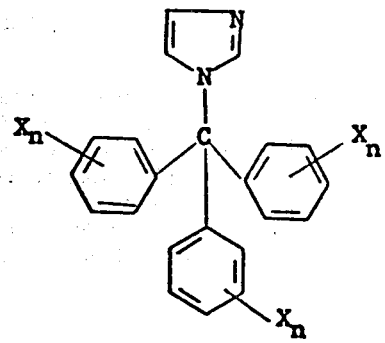

wherein
X is ethoxy, and 2 n's are 0 and 1 n is 1, which consists essentially of reacting imidazole of the formula

with a tritylhalide of the formula

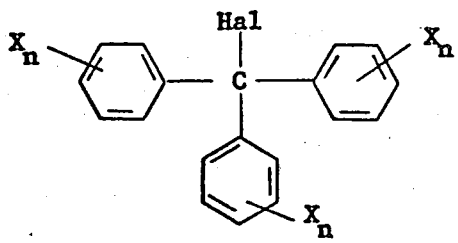

wherein X and n are as above defined, and Hal is halo, in a polar inert organic solvent having a dielectric constant greater than 15 at a temperature substantially between about 0°C to 100°C in the presence of an organic acid binding agent.

47. A process according to claim 46, wherein said said solvent has a dielectric constant between 15 and 50.

48. A process according to claim 46, wherein the temperature is between about 45°C to 90°C.

49. A process according to claim 46, wherein said solvent is selected from the group consisting of acetonitrile, propionitrile, butylnitrile, dimethyl sulfoxide, formamide, N-methylformamide, N-methylacetamide, dimethyl formamide, acetone methylethylketone, diethylketone, cyclohexanon, mesityloxide, nitromethane, nitrobenzene, tetramethylenesulfone, ethyleneglycolmonomethyletheracetate, ethyleneglycolmonobutyletheracetate, butyric acid ethylester, cyanoacetic acid ethylester and acetoacetic acid ethylester.

50. A process according to claim 46, wherein an excess of acid binding agent is used and the agent is selected from the group consisting of imidazole and a tertiary amine.

51. A process according to claim 46, wherein at least the stoichiometric amount of imidazole is used and the solvent is acetonitrile.

52. A process according to claim 51, wherein at least the stoichiometric amount of the acid binding agent is used.

53. A process according to claim 49, wherein the solvent is selected from the group consisting of acetonitrile, propionitrile, butylnitrile, dimethyl sulfoxide, formamide, N-methylformamide, N-methylacetamide, dimethyl formamide, acetone methylethylketone, diethylketone, cyclohexanon, mesityloxide, nitromethane, nitrobenzene, cyanoacetic acid ethylester and acetoacetic acid ethylester.

54. A process for the production of an N-tritylimidazole of the formula:

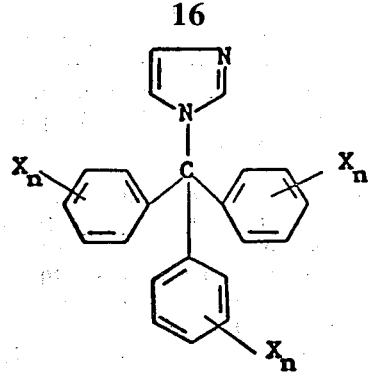

wherein
X is n-propoxy or iso-propoxy and 2 n's are 0 and 1 n is 1,
which consists essentially of reacting imidazole of the formula

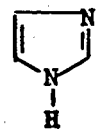

with a tritylhalide of the formula

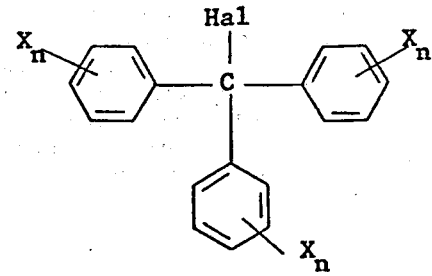

wherein X and n are as above defined, and Hal is halo, in a polar inert organic solvent having a dielectric constant greater than 15 at a temperature substantially between about 0°C to 100°C in the presence of an organic acid binding agent.

55. A process according to claim 54, wherein said solvent has a dielectric constant between 15 and 50.

56. A process according to claim 54, wherein the temperature is between about 45°C to 90°C.

57. A process according to claim 54, wherein said solvent is selected from the group consisting of acetonitrile, propionitrile, butylnitrile, dimethyl sulfoxide, formamide, N-methylformamide, N-methylacetamide, dimethyl formamide, acetone methylethylketone, diethylketone, cyclohexanon, mesityloxide, nitromethane, nitrobenzene, tetramethylenesulfone, ethyleneglycol monomethyletheracetate, ethyleneglycol-monoethyletheracetate, ethyleneglycol-monobutyletheracetate, butyric acid ethylester, cyanoacetic acid ethylester and acetoacetic acid ethylester.

58. A process according to claim 54, wherein an excess of acid binding agent is used and the agent is selected from the group consisting of imidazole and a tertiary amine.

59. A process according to claim 54, wherein at least the stoichiometric amount of imidazole is used and the solvent is acetonitrile.

60. A process according to claim 59, wherein at least the stoichiometric amount of the acid binding agent is used.

61. A process according to claim 57, wherein the solvent is selected from the group consisting of acetonitrile, propionitrile, butylnitrile, dimethylsulfoxide, formamide, N-methylformamide, N-methylacetamide, dimethyl formamide, acetone, methylethylketone, diethylketone, cyclohexanon, mesityloxide, nitromethane, nitrobenzene, cyanoacetic acid ethylester and acetoacetic acid ethylester.

62. A process for the production of an N-tritylimidazole of the formula:

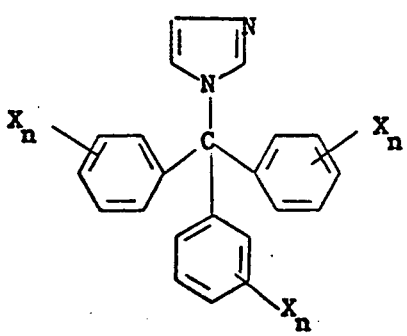

wherein
X is nitro, and 2 $n$'s are 0 and 1 $n$ is 1, which consists essentially of reacting imidazole of the formula

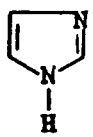

with a tritylhalide of the formula

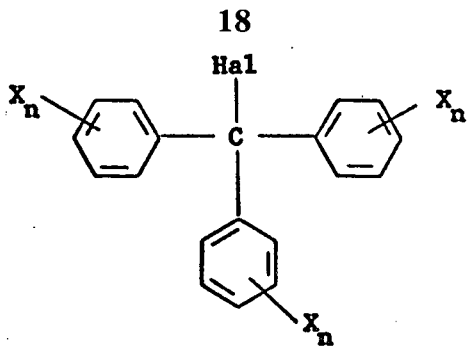

wherein X and $n$ are as above defined, and Hal is halo, in a polar inert organic solvent having a dielectric constant greater than 15 at a temperature substantially between about 0° to 100°C in the presence of an organic acid binding agent.

63. A process according to claim 62, wherein said solvent has a dielectric constant between 15 and 50.

64. A process according to claim 62, wherein the temperature is between about 45°C to 90°C.

65. A process according to claim 62, wherein said solvent is selected from the group consisting of acetonitrile, propionitrile, butylnitrile, dimethyl sulfoxide, formamide, N-methylformamide, N-methylacetamide, dimethyl formamide, acetone methylethylketone, diethylketone, cyclohexanon, mesityloxide, nitromethane, nitrobenzene, tetramethylenesulfone, ethyleneglycol-monomethyletheracetate, ethyleneglycol-monoethyletheracetate, ethyleneglycol-monobutyletheracetate, butyric acid ethylester, cyanoacetic acid ethylester and acetoacetic acid ethylester.

66. A process according to claim 62, wherein an excess of acid binding agent is used and the agent is selected from the group consisting of imidazole and a tertiary amine.

67. A process according to claim 62, wherein at least the stoichiometric amount of imidazole is used and the solvent is acetonitrile.

68. A process according to claim 67, wherein at least the stoichiometric amount of the acid binding agent is used.

69. A process according to claim 65, wherein the solvent is selected from the group consisting of acetonitrile, propionitrile, butylnitrile, dimethyl sulfoxide, formamide, N-methylformamide, N-methylacetamide, dimethyl formamide, acetone, methylethylketone, diethylketone, cyclohexanon, mesityloxide, nitromethane, nitrobenzene, cyanoacetic acid ethylester and acetoacetic acid ethylester.

* * * * *